United States Patent
Schotsch et al.

(10) Patent No.: US 6,431,824 B2
(45) Date of Patent: *Aug. 13, 2002

(54) TURBINE NOZZLE STAGE HAVING THERMOCOUPLE GUIDE TUBE

(75) Inventors: Margaret Jones Schotsch, Greer, SC (US); Francis Lawrence Kirkpatrick, deceased, late of Galway, NY (US), by: Barbara Tomczak, executrix; Eric Michael Lapine, Northwood, NH (US)

(73) Assignee: General Electric Company, Schenectady, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/409,638

(22) Filed: Oct. 1, 1999

(51) Int. Cl.$^7$ ................................. F01D 5/14
(52) U.S. Cl. ................ 415/115; 415/118; 415/134; 374/145; 374/148; 374/179
(58) Field of Search ................ 415/115, 118, 415/134, 137, 139; 374/135, 138, 141, 145, 144, 148, 179

(56) References Cited

U.S. PATENT DOCUMENTS

| | | | | |
|---|---|---|---|---|
| 3,788,143 A | * | 1/1974 | Gabriel | 73/346 |
| 3,874,239 A | * | 4/1975 | Finney | 73/349 |
| 3,907,606 A | * | 9/1975 | Chang | 136/233 |
| 4,132,114 A | * | 1/1979 | Shah et al. | 73/343 R |
| 4,765,751 A | * | 8/1988 | Pannone et al. | 374/143 |
| 4,948,264 A | * | 8/1990 | Hook, Jr. | 374/144 |
| 5,157,914 A | * | 10/1992 | Schwarz et al. | 60/39.29 |

OTHER PUBLICATIONS

"39$^{th}$ GE Turbine State–of–the–Art Technology Seminar", Tab 1,"F" Technology—the First Half–Million Operating Hours, H.E. Miller, Aug. 1996.

"39th GE Turbine State–of–the–Art Technology Seminar", Tab 2, "GE Heavy–Duty Gas Turbine Performance Characteristics", F. J. Brooks, Aug. 1996.

"39th GE Turbine State–of–the–Art Technology Seminar", Tab 3, "9EC 50Hz 170–MW Class Gas Turbine", A. S. Arrao, Aug. 1996.

"39th GE Turbine State–of–the–Art Technology Seminar", Tab 4, "MWS6001FA—An Advanced–Technology 70–MW Class 50/60 Hz Gas Turbine", Ramachandran et al., Aug. 1996.

"39th GE Turbine State–of–the–Art Technology Seminar", Tab 5, "Turbomachinery Technology Advances at Nuovo Pignone", Benvenuti et al., Aug. 1996.

"39th GE Turbine State–of–the–Art Technology Seminar", Tab 6, "GE Aeroderivative Gas Turbines—Design and Operating Features", M.W. Horner, Aug. 1996.

(List continued on next page.)

*Primary Examiner*—Edward K. Look
*Assistant Examiner*—Ninh Nguyen
(74) *Attorney, Agent, or Firm*—Nixon & Vanderhye

(57) ABSTRACT

A guide tube is fixed adjacent opposite ends in outer and inner covers of a nozzle stage segment. The guide tube is serpentine in shape between the outer and inner covers and extends through a nozzle vane. An insert is disposed in the nozzle vane and has apertures to accommodate serpentine portions of the guide tube. Cooling steam is also supplied through chambers of the insert on opposite sides of a central insert chamber containing the guide tube. The opposite ends of the guide tube are fixed to sleeves, in turn fixed to the outer and inner covers.

9 Claims, 5 Drawing Sheets

OTHER PUBLICATIONS

"39th GE Turbine State–of–the–Art Technology Seminar", Tab 7, "Advance Gas Turbine Materials and Coatings", P.W. Schilke, Aug. 1996.

"39th GE Turbine State–of–the–Art Technology Seminar", Tab 8, "Dry Low $NO_x$ Combustion Systems for GE Heavy–Duty Turbines", L. B. Davis, Aug. 1996.

"39th GE Turbine State–of–the–Art Technology Seminar", Tab 9, "GE Gas Turbine Combustion Flexibility", M. A. Davi, Aug. 1996.

"39th GE Turbine State–of–the–Art Technology Seminar", Tab 10, "Gas Fuel Clean–Up System Design Considerations for GE Heavy–Duty Gas Turbines", C. Wilkes, Aug. 1996.

"39th GE Turbine State–of–the–Art Technology Seminar", Tab 11, "Integrated Control Systems for Advanced Combined Cycles", Chu et al., Aug. 1996.

"39th GE Turbine State–of–the–Art Technology Seminar", Tab 12, "Power Systems for the 21st Century "H" Gas Turbine Combined Cycles", Paul et al., Aug. 1996.

"39th GE Turbine State–of–the–Art Technology Seminar", Tab 13, "Clean Coal and Heavy Oil Technologies for Gas Turbines", D. M. Todd, Aug. 1996.

"39th GE Turbine State–of–the–Art Technology Seminar", Tab 14, "Gas Turbine Conversions, Modifications and Uprates Technology", Stuck et al., Aug. 1996.

"39th GE Turbine State–of–the–Art Technology Seminar", Tab 15, "Performance and Reliability Improvements for Heavy–Duty Gas Turbines, "J.R. Johnston, Aug. 1996.

"39th GE Turbine State–of–the–Art Technology Seminar", Tab 16, "Gas Turbine Repair Technology", Crimi et al, Aug. 1996.

"39th GE Turbine State–of–the–Art Technology Seminar", Tab 17, "Heavy Duty Turbine Operating & Maintenance Considerations", R. F. Hoeft, Aug. 1996.

"39th GE Turbine State–of–the–Art Technology Seminar", Tab 18, "Gas Turbine Performance Monitoring and Testing", Schmitt et al., Aug. 1996.

"39th GE Turbine State–of–the–Art Technology Seminar", Tab 19, "Monitoring Service Delivery System and Diagnostics", Madej et al., Aug. 1996.

"39th GE Turbine State–of–the–Art Technology Seminar", Tab 20, "Steam Turbines for Large Power Applications", Reinker et al., Aug. 1996.

"39th GE Turbine State–of–the–Art Technology Seminar", Tab 21, "Steam Turbines for Ultrasupercritical Power Plants", Retzlaff et al., Aug. 1996.

"39th GE Turbine State–of–the–Art Technology Seminar", Tab 22, "Steam Turbine Sustained Efficiency", P. Schofield, Aug. 1996.

"39th GE Turbine State–of–the–Art Technology Seminar", Tab 23, "Recent Advances in Steam Turbines for Industrial and Cogeneration Applications", Leger et al., Aug. 1996.

"39th GE Turbine State–of–the–Art Technology Seminar", Tab 24, "Mechanical Drive Steam Turbines", D. R. Leger, Aug. 1996.

"39th GE Turbine State–of–the–Art Technology Seminar", Tab 25, "Steam Turbines for STAG™ Combined–Cycle Power Systems", M. Boss, Aug. 1996.

"39th GE Turbine State–of–the–Art Technology Seminar", Tab 26, "Cogeneration Application Considerations", Fisk et al., Aug. 1996.

"39th GE Turbine State–of–the–Art Technology Seminar", Tab 27, "Performance and Economic Considerations of Repowering Steam Power Plants", Stoll et al., Aug. 1996.

"39th GE Turbine State–of–the–Art Technology Seminar", Tab 28, "High–Power Density™ Steam Turbine Design Evolution", J. H. Moore, Aug. 1996.

"39th GE Turbine State–of–the–Art Technology Seminar", Tab 29, "Advances in Steam Path Technologies", Cofer, IV, et al., Aug. 1996.

"39th GE Turbine State–of–the–Art Technology Seminar", Tab 30, "Upgradable Opportunities for Steam Turbines", D. R. Dreier, Jr., Aug. 1996.

"39th GE Turbine State–of–the–Art Technology Seminar", Tab 31, "Uprate Options for Industrial Turbines", R. C. Beck, Aug. 1996.

"39th GE Turbine State–of–the–Art Technology Seminar", Tab 32, "Thermal Performance Evaluation and Assessment of Steam Turbine Units", P. Albert, Aug. 1996.

"39th GE Turbine State–of–the–Art Technology Seminar", Tab 33, "Advances in Welding Repair Technology" J. F. Nolan, Aug. 1996.

"39th GE Turbine State–of–the–Art Technology Seminar", Tab 34, "Operation and Maintenance Strategies to Enhance Plant Profitability", MacGillivray et al., Aug. 1996.

"39th GE Turbine State–of–the–Art Technology Seminar", Tab 35, "Generator Insitu Inspections", D. Stanton.

"39th GE Turbine State–of–the–Art Technology Seminar", Tab 36, "Generator Upgrade and Rewind", Halpern et al., Aug. 1996.

"39th GE Turbine State–of–the–Art Technology Seminar", Tab 37, "GE Combined Cycle Product Line and Performance", Chase, et al., Aug. 1996.

"39th GE Turbine State–of–the–Art Technology Seminar", Tab 38, "GE Combined Cycle Experience", Maslak et al., Aug. 1996.

"39th GE Turbine State–of–the–Art Technology Seminar", Tab 39, "Single–Shaft Combined Cycle Power Generation Systems", Tomlinson et al., Aug. 1996.

"Advanced Turbine System Program—Conceptual Design and Product Development", Annual Report, Sep. 1, 1994–Aug. 31, 1995.

"Advanced Turbine Systems (ATS Program) Conceptual Design and Product Development", Final Technical Progress Report, vol. 2– Industrial Machine, Mar. 31, 1997, Morgantown, WV.

"Advanced Turbine Systems (ATS Program), Conceptual Design and Product Development", Final Technical Progress Report, Aug. 31, 1996, Morgantown, WV.

"Advanced Turbine Systems (ATS) Program, Phase 2, Conceptual Design and Product Development", Yearly Technical Progress Report, Reporting Period: Aug. 25, 1993–Aug. 31, 1994.

"Advanced Turbine Systems" Annual Program Review, Preprints, Nov. 2–4, 1998, Washington, D.C. U.S. Department of Energy, Office of Industrial Technologies Federal Energy Technology Center.

"ATS Conference" Oct. 28, 1999, Slide Presentation.

"Baglan Bay Launch Site", various articles relating to Baglan Energy Park.

"Baglan Energy Park", Brochure.

"Commercialization", Del Williamson, Present, Global Sales, May 8, 1998.

"Environmental, Health and Safety Assessment: ATS 7H Program (Phase 3R) Test Activities at the GE Power Systems Gas Turbine Manufacturing Facility, Greenville, SC", Document #1753, Feb. 1998, Publication Date: Nov. 17, 1998, Report Nos. DE–FC21–95MC31176–11.

"Exhibit panels used at 1995 product introduction at PowerGen Europe".

"Extensive Testing Program Validates High Efficiency, reliability of GE's Advanced "H" Gas Turbine Technology", Press Information, Press Release, 96–NR14, Jun. 26, 1996, H Technology Tests/pp. 1–4.

"Extensive Testing Program Validates High Efficiency, Reliability of GE's Advanced "H" Gas Turbine Technology", GE Introduces Advanced Gas Turbine Technology Platform: First to Reach 60% Combined–Cycle Power Plant Efficiency, Press Information, Press Release, Power–Gen Europe '95, 95–NRR15, Advanced Technology Introduction/pp. 1–6.

"Gas, Steam Turbine Work as Single Unit in GE's Advanced H Technology Combined–Cycle System", Press Information, Press Release, 95–NR18, May 16, 1995, Advanced Technology Introduction/pp. 1–3.

"GE Breaks 60% Net Efficiency Barrier" paper, 4 pages.

"GE Business Share Technologies and Experts to Develop State–Of–The–Art Products", Press Information, Press Release 95–NR10, May 16, 1995, GE Technology Transfer/pp. 1–3.

"General Electric ATS Program Technical Review, Phase 2 Activities", T. Chance et al., pp. 1–4.

"General Electric's DOE/ATS H Gas Turbine Development" Advanced Turbine Systems Annual Review Meeting, Nov. 7–8, 1996, Washington, D.C., Publication Release.

"H Technology Commercialization", 1998 MarComm Activity Recommendation, Mar., 1998.

"H Technology", Jon Ebacher, VP, Power Gen Technology, May 8, 1998.

"H Testing Process", Jon Ebacher, VP, Power Gen Technology, May 8, 1998.

"Heavy–Duty & Aeroderivative Products" Gas Turbines, Brochure, 1998.

"MS7001H/MS9001H Gas Turbine, gepower.com website for PowerGen Europe" Jun. 1–3 going public Jun. 15, (1995).

"New Steam Cooling System is a Key to 60% Efficiency For GE "H" Technology Combined–Cycle Systems", Press Information, Press Release, 95–NRR16, May 16, 1995, H Technology/pp. 1–3.

"Overview of GE's H Gas Turbine Combined Cycle", Jul. 1, 1995 to Dec. 31, 1997.

"Power Systems for the $21^{st}$ Century—"H" Gas Turbine Combined Cycles", Thomas C. Paul et al., Report.

"Power–Gen '96 Europe", Conference Programme, Budapest, Hungary, Jun. 26–28, 1996.

"Power–Gen International", 1998 Show Guide, Dec. 9–11, 1998, Orange County Convention Center, Orlando, Florida.

"Press Coverage following 1995 product announcement"; various newspaper clippings relating to improved generator.

"Proceedings of the Advanced Turbine Systems Annual Program Review Meeting", vol. I, "Industrial Advanced Turbine Systems Program Overview", D.W. Esbeck, p. 3–13, Oct., 1995.

"Proceedings of the Advanced Turbine Systems Annual Program Review Meeting", vol. I, "H Gas Turbine Combined Cycle", J. Corman, p. 14–21, Oct., 1995.

"Proceedings of the Advanced Turbine Systems Annual Program Review Meeting", vol. I, "Overview of Westinghouse's Advanced Turbine Systems Program", Bannister et al., p. 22–30, Oct., 1995.

"Proceedings of the Advanced Turbine Systems Annual Program Review Meeting", vol. I, "Allison Engine ATS Program Technical Review", D. Mukavetz, p. 31–42, Oct., 1995.

"Proceedings of the Advanced Turbine Systems Annual Program Review Meeting", vol. I, "Advanced Turbine Systems Program Industrial System Concept Development", S. Gates, p. 43–63, Oct., 1995.

"Proceedings of the Advanced Turbine Systems Annual Program Review Meeting", vol. I, "Advanced Turbine System Program Phase 2 Cycle Selection", Latcovich, Jr., p. 64–69, Oct., 1995.

"Proceedings of the Advanced Turbine Systems Annual Program Review Meeting", vol. I, "General Electric ATS Program Technical Review Phase 2 Activities", Chance et al., p. 70–74, Oct., 1995.

"Proceedings of the Advanced Turbine Systems Annual Program Review Meeting", vol. I, "Technical Review of Westinghouse's Advanced Turbine Systems Program", Diakunchak et al., p. 75–86, Oct., 1995.

"Proceedings of the Advanced Turbine Systems Annual Program Review Meeting", vol. I, "Advanced Combustion Turbines and Cycles: An EPRI Perspective", Touchton et al., p. 87–88, Oct., 1995.

"Proceedings of the Advanced Turbine Systems Annual Program Review Meeting", vol. I, "Advanced Turbine Systems Annual Program Review", William E. Koop, p. 89–92, Oct., 1995.

"Proceedings of the Advanced Turbine Systems Annual Program Review Meeting", vol. I, "The AGTSR Consortium: An Update", Fant et al., p. 93–102, Oct., 1995.

"Proceedings of the Advanced Turbine Systems Annual Program Review Meeting", vol. I, "Overview of Allison/AGTSR Interactions", Sy A. Ali, p. 103–106, Oct., 1995.

"Proceedings of the Advanced Turbine Systems Annual Program Review Meeting", vol. I, "Design Factors for Stable Lean Premix Combustion", Richards et al., p. 107–113, Oct., 1995.

"Proceedings of the Advanced Turbine Systems Annual Program Review Meeting", vol. I, "Ceramic Stationary as Turbine", M. van Roode, p. 114–147, Oct., 1995.

"Proceedings of the Advanced Turbine Systems Annual Program Review Meeting", vol. I, "DOE/Allison Ceramic Vane Effort", Wenglarz et al., p. 148–151, Oct., 1995.

"Proceedings of the Advanced Turbine Systems Annual Program Review Meeting", vol. I, "Materials/Manufacturing Element of the Advanced Turbine Systems Program", Karnitz et al., p. 152–160, Oct., 1995.

"Proceedings of the Advanced Turbine Systems Annual Program Review Meeting", vol. I, "Land–Based Turbine Casting Initiative", Mueller et al., p. 161–170, Oct., 1995.

"Proceedings of the Advanced Turbine Systems Annual Program Review Meeting", vol. I, "Turbine Airfoil Manufacturing Technology", Kortovich, p. 171–181, Oct., 1995.

"Proceedings of the Advanced Turbine Systems Annual Program Review Meeting", vol. I, "Pratt & Whitney Thermal Barrier Coatings", Bornstein et al., p. 182–193, Oct., 1995.

"Proceedings of the Advanced Turbine Systems Annual Program Review Meeting", vol. I, "Westinhouse Thermal Barrier Coatings", Goedjen et al., p. 194–199, Oct., 1995.

"Proceedings of the Advanced Turbine Systems Annual Program Review Meeting", vol. I, "High Performance Steam Development", Duffy et al., p. 200–220, Oct., 1995.

"Proceedings of the Advanced Turbine Systems Annual Program Review Meeting", vol. II, "Lean Premixed Combustion Stabilized by Radiation Feedback and heterogeneous Catalysis", Dibble et al., p. 221–232, Oct., 1995.

"Proceedings of the Advanced Turbine Systems Annual Program Review Meeting", vol. II, Rayleigh/Raman/LIF Measurements in a Turbulent Lean Premixed Combustor, Nandula et al. p. 233–248, Oct., 1995.

"Proceedings of the Advanced Turbine Systems Annual Program Review Meeting", vol. II, "Lean Premixed Flames for Low $NO_x$ Combustors", Sojka et al., p. 249–275, Oct., 1995.

"Proceedings of the Advanced Turbine Systems Annual Program Review Meeting", vol. II, "Functionally Gradient Materials for Thermal Barrier Coatings in Advanced Gas Turbine Systems", Banovic et al., p. 276–280, Oct., 1995.

"Proceedings of the Advanced Turbine Systems Annual Program Review Meeting", vol. II, "Advanced Turbine Cooling, Heat Transfer, and Aerodynamic Studies", Han et al., p. 281–309, Oct., 1995.

"Proceedings of the Advanced Turbine Systems Annual Program Review Meeting", vol. II, "Life Prediction of Advanced Materials for Gas Turbine Application", Zamrik et al., p. 310–327, Oct., 1995.

"Proceedings of the Advanced Turbine Systems Annual Program Review Meeting", vol. II, "Advanced Combustion Technologies for Gas Turbine Power Plants", Vandsburger et al., p. 328–352, Oct., 1995.

"Proceedings of the Advanced Turbine Systems Annual Program Review Meeting", vol. II, "Combustion Modeling in Advanced Gas Turbine Systems", Smoot et al., p. 353–370, Oct., 1995.

"Proceedings of the Advanced Turbine Systems Annual Program Review Meeting", vol. II, "Heat Transfer in a Two–Pass Internally Ribbed Turbine Blade Coolant Channel with Cylindrical Vortex Generators", Hibbs et al. p. 371–390, Oct., 1995.

"Proceedings of the Advanced Turbine Systems Annual Program Review Meeting", vol. II, "Rotational Effects on Turbine Blade Cooling", Gobatzidakia et al., p. 391–392, Oct., 1995.

"Proceedings of the Advanced Turbine Systems Annual Program Review Meeting", vol. II, "Manifold Methods for Methane Combustion", Yang et al., p. 393–409, Oct., 1995.

"Proceedings of the Advanced Turbine Systems Annual Program Review Meeting", vol. II, "Advanced Multistage Turbine Blade Aerodynamics, Performance, Cooling, and Heat Transfer", Fleeter et al., p. 410–414, Oct., 1995.

"Proceedings of the Advanced Turbine Systems Annual Program Review Meeting, vol. II", The Role of Reactant Unmixedness, Strain Rate, and Length Scale on Premixed Combustor Performance, Samuelsen et al., p. 415–422, Oct., 1995.

"Proceedings of the Advanced Turbine Systems Annual Program Review Meeting", vol. II, "Experimental and Computational Studies of Film Cooling With Compound Angle Injection", Goldstein et al., p. 423–451, Oct., 1995.

"Proceedings of the Advanced Turbine Systems Annual Program Review Meeting", vol. II, "Compatibility of Gas Turbine Materials with Steam Cooling", Desai et al., p. 452–464, Oct., 1995.

"Proceedings of the Advanced Turbine Systems Annual Program Review Meeting", vol. II, "Use of a Laser–Induced Fluorescence Thermal Imaging System for Film Cooling Heat Transfer Measurement", M. K. Chyu, p. 465–473, Oct., 1995.

"Proceedings of the Advanced Turbine Systems Annual Program Review Meeting", vol. II, Effects of Geometry on Slot–Jet Film Cooling Performance, Hyams et al., p. 474–496 Oct., 1995.

"Proceedings of the Advanced Turbine Systems Annual Program Review Meeting", vol. II, "Steam as Turbine Blade Coolant: Experimental Data Generation", Wilmsen et al., p. 497–505, Oct., 1995.

"Proceedings of the Advanced Turbine Systems Annual Program Review Meeting", vol. II, "Combustion Chemical Vapor Deposited Coatings for Thermal Barrier Coating Systems", Hampikian et al., p. 506–515, Oct., 1995.

"Proceedings of the Advanced Turbine Systems Annual Program Review Meeting", vol. II, "Premixed Burner Experiments: Geometry, Mixing, and Flame Structure Issues", Gupta et al., p. 516–528, Oct., 1995.

"Proceedings of the Advanced Turbine Systems Annual Program Review Meeting", vol. II, "Intercooler Flow Path for Gas Turbines: CFD Design and Experiments", Agrawal et al., p. 529–538, Oct., 1995.

"Proceedings of the Advanced Turbine Systems Annual Program Review Meeting", vol. II, "Bond Strength and Stress Measurements in Thermal Barrier Coatings", Gell et al., p. 539–549, Oct., 1995.

"Proceedings of the Advanced Turbine Systems Annual Program Review Meeting", vol. II, "Active Control of Combustion Instabilities in Low $NO_x$ Gas Turbines", Zinn et al., p. 550–551, Oct., 1995.

"Proceedings of the Advanced Turbine Systems Annual Program Review Meeting", vol. II, "Combustion Instability Modeling and Analysis", Santoro et al., p. 552–559, Oct., 1995.

"Proceedings of the Advanced Turbine Systems Annual Program Review Meeting", vol. II, "Flow and Heat Transfer in Gas Turbine Disk Cavities Subject to Nonuniform External Pressure Field", Roy et al., p. 560–565, Oct., 1995.

"Proceedings of the Advanced Turbine Systems Annual Program Review Meeting", vol. II, "Heat Pipe Turbine Vane Cooling", Langston et al., p. 566–572, Oct., 1995.

"Proceedings of the Advanced Turbine Systems Annual Program Review Meeting", vol. II, "Improved Modeling Techniques for Turbomachinery Flow Fields", Lakshminarayana et al., p. 573–581, Oct., 1995.

"Proceedings of the Advanced Turbine Systems Annual Program Review Meeting", vol. II, "Advanced 3D Inverse Method for Designing Turbomachine Blades", T. Dang, p. 582, Oct., 1995.

"Proceedings of the Advanced Turbine Systems Annual Program Review Meeting", "ATS and the Industries of the Future", Denise Swink, p. 1, Nov., 1996.

"Proceedings of the Advanced Turbine Systems Annual Program Review Meeting", "Gas Turbine Association Agenda", William H. Day, p. 3–16, Nov., 1996.

"Proceedings of the Advanced Turbine Systems Annual Program Review Meeting", "Power Needs in the Chemical Industry", Keith Davidson, p. 17–26, Nov., 1996.

"Proceedings of the Advanced Turbine Systems Annual Program Review Meeting", "Advanced Turbine Systems Program Overview", David Esbeck, p. 27–34, Nov., 1996.

"Proceedings of the Advanced Turbine Systems Annual Program Review Meeting", "Westinghouse's Advanced Turbine Systems Program", Gerard McQuiggan, p. 35–48, Nov., 1996.

"Proceedings of the Advanced Turbine Systems Annual Program Review Meeting", "Overview of GE's H Gas Turbine Combined Cycle", Cook et al., p. 49–72, Nov., 1996.

"Proceedings of the Advanced Turbine Systems Annual Program Review Meeting", "Allison Advanced Simple Cycle Gas Turbine System", William D. Weisbrod, p. 73–94, Nov., 1996.

"Proceedings of the Advanced Turbine Systems Annual Program Review Meeting", "The AGTSR Industry–University Consortium", Lawrence P. Golan, p. 95–110, Nov., 1996.

"Proceedings of the Advanced Turbine Systems Annual Program Review Meeting", "$NO_x$ and CO Emissions Models for Gas–Fired Lean–Premixed Combustion Turbines", A. Mellor, p. 111–112, Nov., 1996.

"Proceedings of the Advanced Turbine Systems Annual Program Review Meeting", "Methodologies for Active Mixing and Combustion Control", Uri Vandsburger, p. 123–156, Nov., 1996.

"Proceedings of the Advanced Turbine Systems Annual Program Review Meeting", "Combustion Modeling in Advanced Gas Turbine Systems", Paul O. Hedman, p. 157–180, Nov., 19967.

"Proceedings of the Advanced Turbine Systems Annual Program Review Meeting", "Manifold Methods for Methane Combustion", Stephen B. Pope, p. 181–188, Nov., 1996.

"Proceedings of the Advanced Turbine Systems Annual Program Review Meeting", "The Role of Reactant Unmixedness, Strain Rate, and Length Scale on Premixed Combustor Performance", Scott Samuelsen, p. 189–210, Nov., 1996.

"Proceedings of the Advanced Turbine Systems Annual Program Review Meeting", "Effect of Swirl and Momentum Distrubition on Temperature Distribution in Premixed Flames", Ashwani K. Gupta, p. 211–232, Nov., 1996.

"Proceedings of the Advanced Turbine Systems Annual Program Review Meeting", "Combustion Instability Studies Application to Land–Based Gas Turbine Combustors", Robert J. Santoro, p. 233–252.

"Proceedings of the Advanced Turbine Systems Annual Program Review Meeting", Active Control of Combustion Instabilities in Low $NO_x$ Turbines, Ben T. Zinn, p. 253–264, Nov., 1996.

"Proceedings of the Advanced Turbine Systems Annual Program Review Meeting", "Life Prediction of Advanced Materials for Gas Turbine Application," Sam Y. Zamrik, p. 265–274, Nov., 1996.

"Proceedings of the Advanced Turbine Systems Annual Program Review Meeting", "Combustion Chemical Vapor Deposited Coatings for Thermal Barrier Coating Systems", W. Brent Carter, p. 275–290, Nov., 1996.

"Proceedings of the Advanced Turbine Systems Annual Program Review Meeting", "Compatibility of Gas Turbine Materials with Steam Cooling", Vimal Desai, p. 291–314, Nov., 1996.

"Proceedings of the Advanced Turbine Systems Annual Program Review Meeting", "Bond Strength and Stress Measurements in Thermal Barrier Coatings", Maurice Gell, p. 315–334, Nov., 1996.

"Proceedings of the Advanced Turbine Systems Annual Program Review Meeting", "Advanced Multistage Turbine Blade Aerodynamics, Performance, Cooling and Heat Transfer", Sanford Fleeter, p. 335–356, Nov., 1996.

"Proceedings of the Advanced Turbine Systems Annual Program Review Meeting", "Flow Characteristics of an Intercooler System for Power Generating Gas Turbines", Ajay K. Agrawal, p. 357–370, Nov., 1996.

"Proceedings of the Advanced Turbine Systems Annual Program Review Meeting", "Improved Modeling Techniques for Turbomachinery Flow Fields", B. Lakshiminarayana, p. 371–392, Nov., 1996.

"Proceedings of the Advanced Turbine Systems Annual Program Review Meeting", "Development of an Advanced 3d & Viscous Aerodynamic Design Method for Turbomachine Components in Utility and Industrial Gas Turbine Applications", Thong Q. Dang, p. 393–406, Nov., 1996.

"Proceedings of the Advanced Turbine Systems Annual Program Review Meeting", "Advanced Turbine Cooling, Heat Transfer, and Aerodynamic Studies", Je–Chin Han, p. 407–426, Nov., 1996.

"Proceedings of the Advanced Turbine Systems Annual Program Review Meeting", "Heat Transfer in a Two–Pass Internally Ribbed Turbine Blade Coolant Channel with Vortext Generators", S. Acharya, p. 427–446.

"Proceedings of the Advanced Turbine Systems Annual Program Review Meeting", "Experimental and Computational Studies of Film Cooling with Compound Angle Injection", R. Goldstein, p. 447–460, Nov., 1996.

"Proceedings of the Advanced Turbine Systems Annual Program Review Meeting", "Study of Endwall Film Cooling with a Gap Leakage Using a Thermographic Phosphor Fluorescence Imaging System", Mingking K. Chyu, p. 461–470, Nov., 1996.

"Proceedings of the Advanced Turbine Systems Annual Program Review Meeting", "Steam as a Turbine Blade Coolant: External Side Heat Transfer", Abraham Engeda, p. 471–482, Nov., 1996.

"Proceedings of the Advanced Turbine Systems Annual Program Review Meeting", "Flow and Heat Transfer in Gas Turbine Disk Cavities Subject to Nonuniform External Pressure Field", Ramendra Roy, p. 483–498, Nov., 1996.

"Proceedings of the Advanced Turbine Systems Annual Program Review Meeting", "Closed–Loop Mist/Steam Cooling for Advanced Turbine Systems", Ting Wang, p. 499–512, Nov., 1996.

"Proceedings of the Advanced Turbine Systems Annual Program Review Meeting", "Heat Pipe Turbine Vane Cooling", Langston et al., p. 513–534, Nov., 1996.

"Proceedings of the Advanced Turbine Systems Annual Program Review Meeting", "EPRI's Combustion Turbine Program: Status and Future Directions", Arthur Cohn, p. 535–552, Nov., 1996.

"Proceedings of the Advanced Turbine Systems Annual Program Review Meeting", "ATS Materials Support", Michael Karnitz, p. 553–576, Nov., 1996.

"Proceedings of the Advanced Turbine Systems Annual Program Review Meeting", "Land Based Turbine Casting Initiative", Boyd A. Mueller, p. 577–592, Nov., 1996.

"Proceedings of the Advanced Turbine Systems Annual Program Review Meeting", "Turbine Airfoil Manufacturing Technology", Charles S. Kortovich, p. 593–622, Nov., 1996.

"Proceedings of the Advanced Turbine Systems Annual Program Review Meeting", "Hot Corrosion Testing of TBS's", Norman Bornstein, p. 623–631, Nov., 1996.

"Proceedings of the Advanced Turbine Systems Annual Program Review Meetin", "Ceramic Stationary Gas Turbine", Mark van Roode, p. 633–658, Nov., 1996.

"Proceedings of the Advanced Turbine Systems Annual Program Review Meeting", "Western European Status of Ceramics for Gas Turbines", Tibor Bornemisza, p. 659–670, Nov., 1996.

"Proceedings of the Advanced Turbine Systems Annual Program Review Meeting", "Status of Ceramic Gas Turbines in Russia", Mark van Roode, p. 671, Nov., 1996.

"Status Report: The U.S. Department of Energy's Advanced Turbine systems Program", facsimile dated Nov. 7, 1996.

"Testing Program Results Validate GE's H Gas Turbine—High Efficiency, Low Cost of Electricity and Low Emissions", Roger Schonewald and Patrick Marolda, (no date available).

"Testing Program Results Validate GE's H Gas Turbine—High Efficiency, Low Cost of Electricity and Low Emissions", Slide Presentation—working draft, (no date available).

"The Next Step In H . . . For Low Cost Per kW–Hour Power Generation", LP–1 PGE '98.

"Utility Advanced Turbine System (ATS) Technology Readiness Testing and Pre–Commercialization Demonstration", Document #486040, Oct. 1–Dec. 31, 1996, Publication Date, Jun. 1, 1997, Report Nos.: DOE/MC/31176–5628.

"Utility Advanced Turbine System (ATS) Technology Readiness Testing—Phase 3", Document #666274, Oct. 1, 1996–Sep. 30, 1997, Publication Date, Dec. 31, 1997, Report Nos.: DOE/MC/31176–10.

"Utility Advanced Turbine System (ATS) Technology Readiness Testing and Pre–Commercial Demonstration, Phase 3", Document #486029, Oct. 1–Dec. 31, 1995, Publication Date, May 1, 1997, Report Nos.: DOE/MC/31176–5340.

"Utility Advanced Turbine System (ATS) Technology Readiness Testing and Pre–Commercial Demonstration—Phase 3", Document #486132, Apr. 1–Jun. 30, 1976, Publication Date, Dec. 31, 1996, Report Nos.: DOE/MC/31176–5660.

"Utility Advanced Turbine System (ATS) Technology Readiness Testing and Pre–Commercial Demonstration—Phase 3", Document #587906, Jul. 1–Sep. 30, 1995, Publication Date, Dec. 31, 1995, Report Nos.: DOE/MC/31176–5339.

"Utility Advanced Turbine System (ATS) Technology Readiness Testing and Pre–Commercial Demonstration" Document #666277, Apr. 1–Jun. 30, 1997, Publication Date, Dec. 31, 1997, Report Nos.: DOE/MC/31176–8.

"Utility Advanced Turbine System (ATS) Technology Readiness Testing and Pre–Commercialization Demonstration", Jan. 1–Mar. 31, 1996, DOE/MC/31176–5338.

"Utility Advanced Turbine System (ATS) Technology Readiness Testing: Phase 3R", Document #756552, Apr. 1–Jun. 30, 1999, Publication Date, Sep. 1, 1999, Report Nos.: DE–FC21–95MC31176–23.

"Utility Advanced Turbine System (ATS) Technology Readiness Testing.", Document #656823, Jan. 1–Mar. 31, 1998, Publication Date, Aug. 1, 1998, Report Nos.: DOE/MC/31176–17.

"Utility Advanced Turbine Systems (ATS) Technology Readiness Testing and Pre–Commercial Demonstration", Annual Technical Progress Report, Reporting Period: Jul. 1, 1995–Sep. 30, 1996.

"Utility Advanced Turbine Systems (ATS) Technology Readiness Testing", Phase 3R, Annual Technical Progress Report, Reporting Period: Oct. 1, 1997–Sep. 30, 1998.

"Utility Advanced Turbine Systems (ATS) Technology Readiness Testing", Document #750405, Oct. 1–Dec. 30, 1998, Publication Date: May, 1, 1999, Report Nos.: DE–FC21–95MC31176–20.

"Utility Advanced Turbine Systems (ATS) Technology Readiness Testing", Document #1348, Apr. 1–Jun. 29, 1998, Publication Date Oct. 29, 1998, Report Nos.: DE–FC21–95MC31176–18.

"Utility Advanced Turbine System (ATS) Technology Readiness Testing—Phase 3", Annual Technical Progress Report, Reporting Period: Oct. 1, 1996–Sep. 30, 1997.

"Utility Advanced Turbine Systems (ATS) Technology Readiness Testing and Pre–Commercial Demonstration", Quarterly Report, Jan. 1–Mar. 31, 1997, Document #666275, Report Nos.: DOE/MC/31176–07.

"Proceeedings of the 1997 Advanced Turbine Systems", Annual Program Review Meeting, Oct. 28–29, 1997.

* cited by examiner

TURBINE NOZZLE STAGE HAVING THERMOCOUPLE GUIDE TUBE

This invention was made with Government support under Contract No. DE-FC21-95MC31176 awarded by the Department of Energy. The Government has certain rights in this invention.

BACKGROUND OF THE INVENTION

The present invention relates to turbines, for example, land-based gas turbines having nozzle stages and particularly to a guide tube for a thermocouple wire extending through a vane of the nozzle stage containing a thermal cooling medium.

BRIEF SUMMARY OF THE INVENTION

In turbines, particularly land-based gas turbines, it is desirable to monitor the temperature of the wheelspaces between the wheels and diaphragms. Thermocouple wires may extend through one of the nozzle vanes for mounting the thermocouple sensor probe to measure the temperature of the wheelspace. The thermocouple wires are typically encased in tubes to ensure the integrity of the wire throughout the life of the turbine.

In advanced gas turbines, however, a thermal cooling medium flows through the nozzle vanes of the various nozzle stages for cooling the nozzle surfaces exposed to the hot gas path. The preferred cooling medium in one such advanced gas turbine is steam. The steam flows into a plenum between an outer cover and an outer band of a nozzle stage for flow through an impingement plate for impingement-cooling of the outer band surfaces. Spent impingement steam flows through openings into vane extensions for flow radially inwardly through the vane. Typically, inserts are employed within the nozzle vane cavities which receive the cooling flow and pass the cooling flow through openings in the inserts for impingement-cooling of the surfaces of the nozzle vanes. The spent impingement-cooling steam then flows radially inwardly into a plenum between the inner cover and the inner band for flow through openings in an impingement plate for impingement-cooling of the inner band surfaces. The spent cooling medium then returns through one of the cavities of the nozzle vane and through the outer band and cover.

When using a thermal cooling medium such as steam, it is vital that the steam does not leak into the wheelspace areas or the hot gas path, as well as other areas within the turbine. A problem, however, develops when a thermocouple wire is extended within a guide tube through a nozzle vane carrying a thermal cooling medium. Because of a thermal responsive mismatch between the thermocouple guide tube, for example, a straight, linearly extending tube housing the thermocouple wire and fixed opposite ends of the thermocouple guide tube, the tube will not accommodate movement responsive to the thermal cooling medium. Moreover, the tube must also be sealed to prevent leakage of the cooling medium.

In accordance with a preferred embodiment of the present invention, a non-linearly extending tube housing the thermocouple wire extends through sleeves fixed and sealed to the outer and inner covers, respectively. The tube is likewise fixed and sealed to the sleeves. To accommodate thermal expansion and contraction of the tube, the tube is non-linear in shape and thus flexes between the outer and inner covers. More particularly, the tube is serpentine in configuration to accommodate the thermal movement. Additionally, the cavity within the nozzle vane through which the guide tube extends has an insert for facilitating impingement-cooling of the surface of the nozzle vane. To accommodate the thermocouple guide tube and its thermally responsive movement within the cavity, the insert has a pair of chambers adjacent suction and pressure sides of the vane. The inserts have openings through walls thereof for impingement-cooling of the suction and pressure surfaces of the nozzles. The interior walls of the insert defining the chambers are spaced from one another and are preferably connected by a pair of side walls defining a central chamber through the insert. Apertures, preferably elongated, are formed through the side walls to receive serpentine portions of the guide tube. Thus, the guide tube extends from the outer cover through the outer band into the central chamber of the insert, outwardly through an aperture in one wall of the central chamber and then returns into the central chamber for extension through an aperture in the opposite wall and return into the central chamber. The tube then extends through the inner band and the inner cover.

In accordance with a preferred embodiment of the present invention, the guide tube is fixed to the inner and outer covers. This is accomplished preferably by; fixing and sealing, e.g., welding, the tube end portions in sleeves in turn fixed and sealed to the covers. Thus, the serpentine configuration of the guide tube facilitates expansion and contraction of the guide tube within the nozzle vane and between the mounting sleeves while leakage of cooling medium is precluded by the seal between the tube and sleeves and sleeves and covers at radial inner and outer end portions of the nozzle.

In a preferred embodiment according to the present invention, there is provided in a turbine having stages including a fixed nozzle stage segment having inner and outer bands, a plurality of nozzle vanes extending between the inner and outer bands, and inner and outer covers overlying the inner and outer bands, respectively, apparatus for guiding a thermocouple through the fixed stage, comprising a tube extending through the outer cover, the outer band, a nozzle vane of the fixed nozzle stage, the inner band and the inner cover, a thermocouple wire within the tube, the tube extending non-linearly through the nozzle vane and fixed at opposite ends to the outer cover and the inner cover, respectively, the tube being responsive to temperature variations to expand and contract within the nozzle vane while remaining fixed at opposite ends thereof to the outer and inner covers.

DETAILED DESCRIPTION OF THE INVENTION

Figure 2:
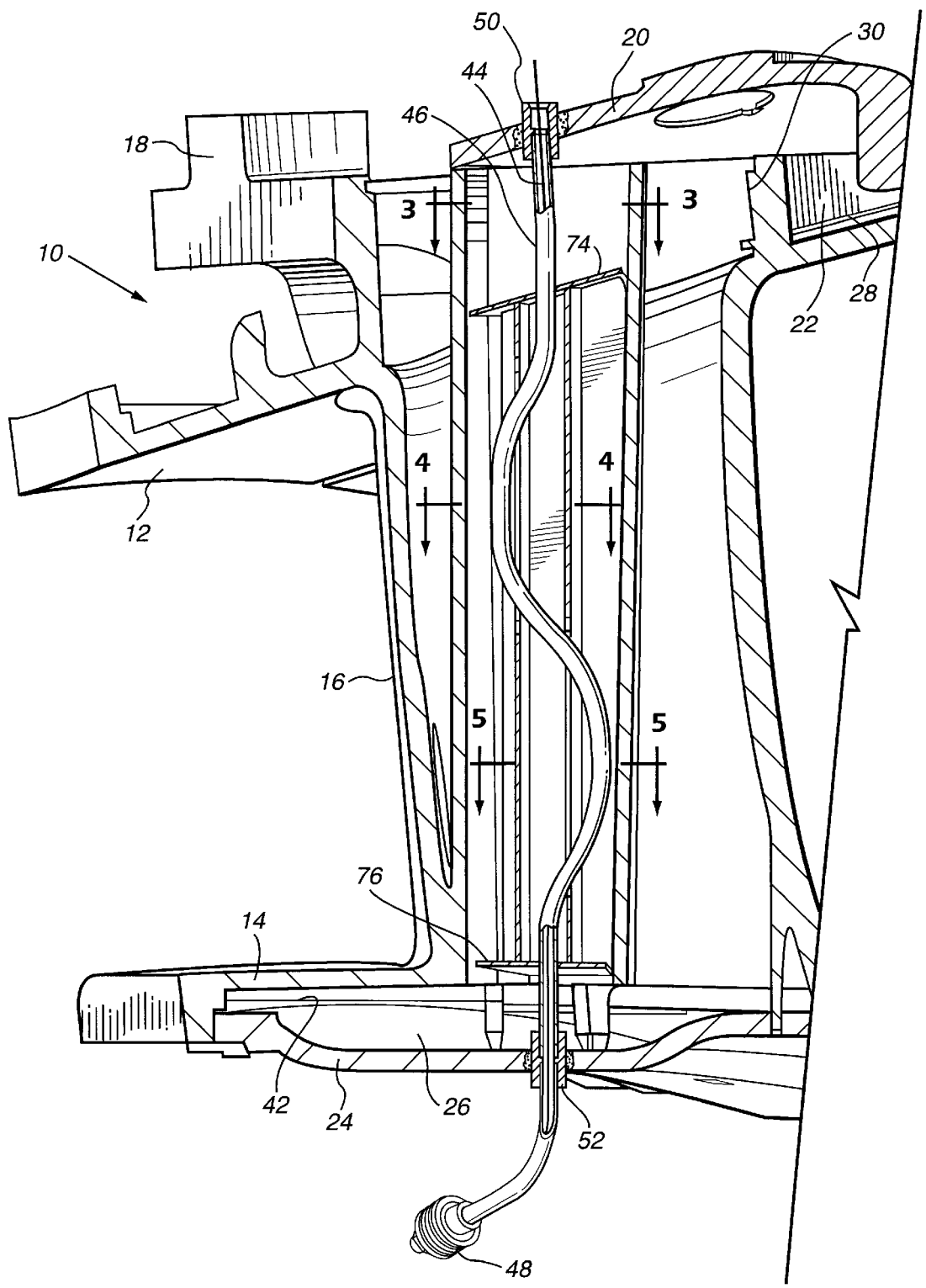
FIG. 2 is a fragmentary perspective view of a nozzle segment with parts broken out and in cross-section illustrating a thermocouple guide tube extending through the nozzle segment in accordance with a preferred form of the present invention.
Figure 3:
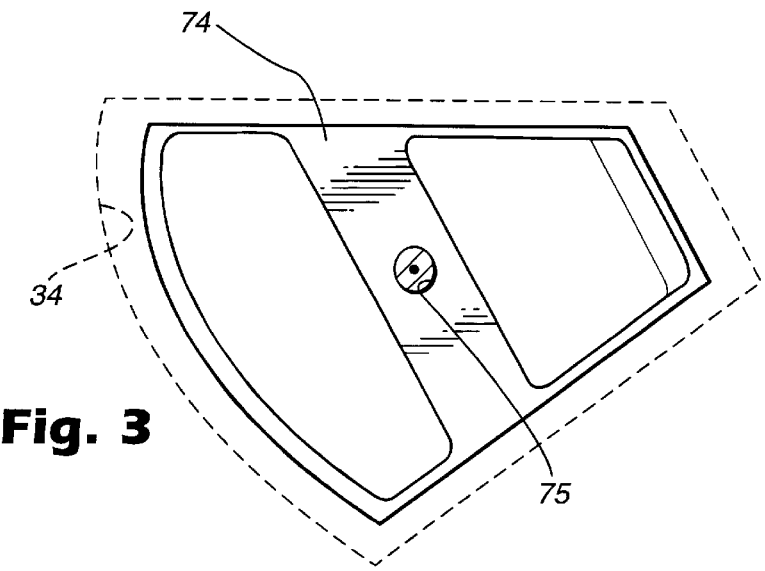
FIGS. 3, 4 and 5 are cross-sectional views taken generally about on lines 3—3, 4—4 and 5—5 in FIG. 2.
Figure 4:
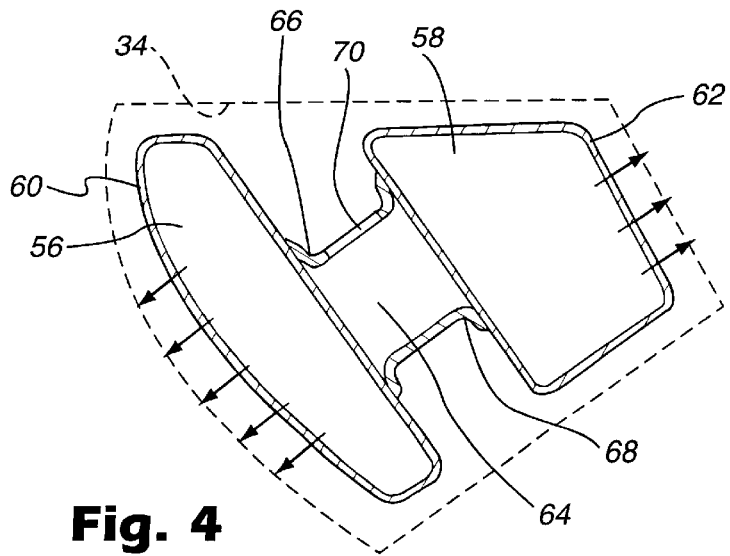
Figure 5:
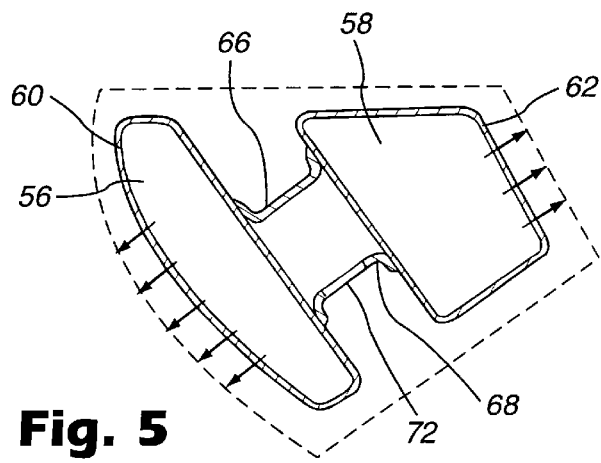
Figure 6:
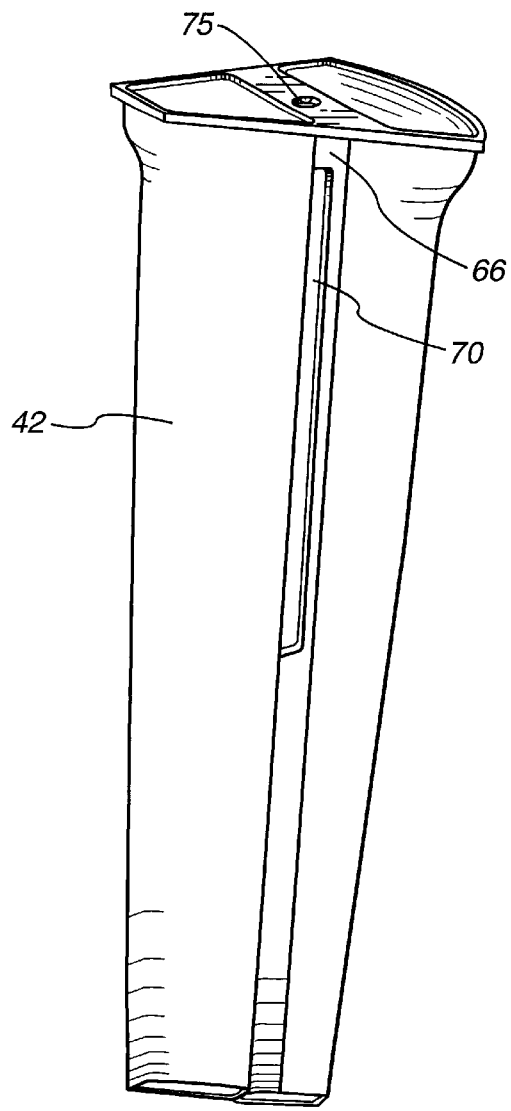
FIGS. 6 and 7 are opposite side views of an insert through a cavity of the nozzle vane illustrated in FIG. 1.
Figure 7:
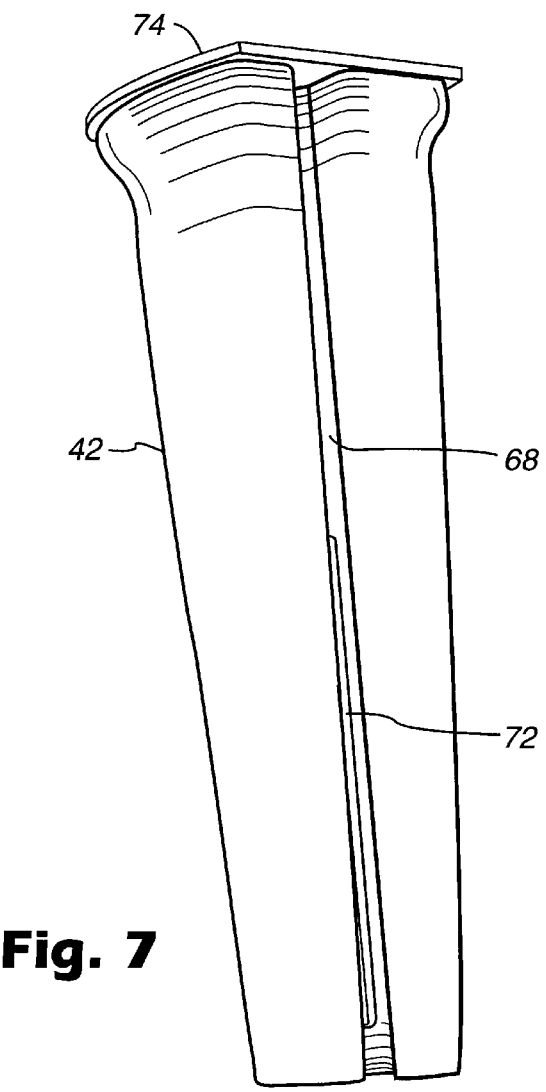

Referring now to the drawings, particularly to FIG. 2, there is illustrated a nozzle segment, generally designated 10, forming one of a plurality of a circumferential array of nozzle segments about the rotary axis of a turbine. The nozzle segment 10 includes an outer band 12, an inner band 14 and a vane 16 extending between the outer and inner bands 12 and 14, respectively. It will be appreciated that a plurality of vanes 16 are arranged about the rotor axis and lie in the hot gas path, the outer and inner bands 12 and 14, respectively, defining the portions of the annular hot gas path through the turbine. A forward hook 18 projects generally radially outwardly of the outer band 12 for engagement with structural supports on the turbine frame, not shown, whereby the segments 10 are supported about the turbine axis.

Figure 1:
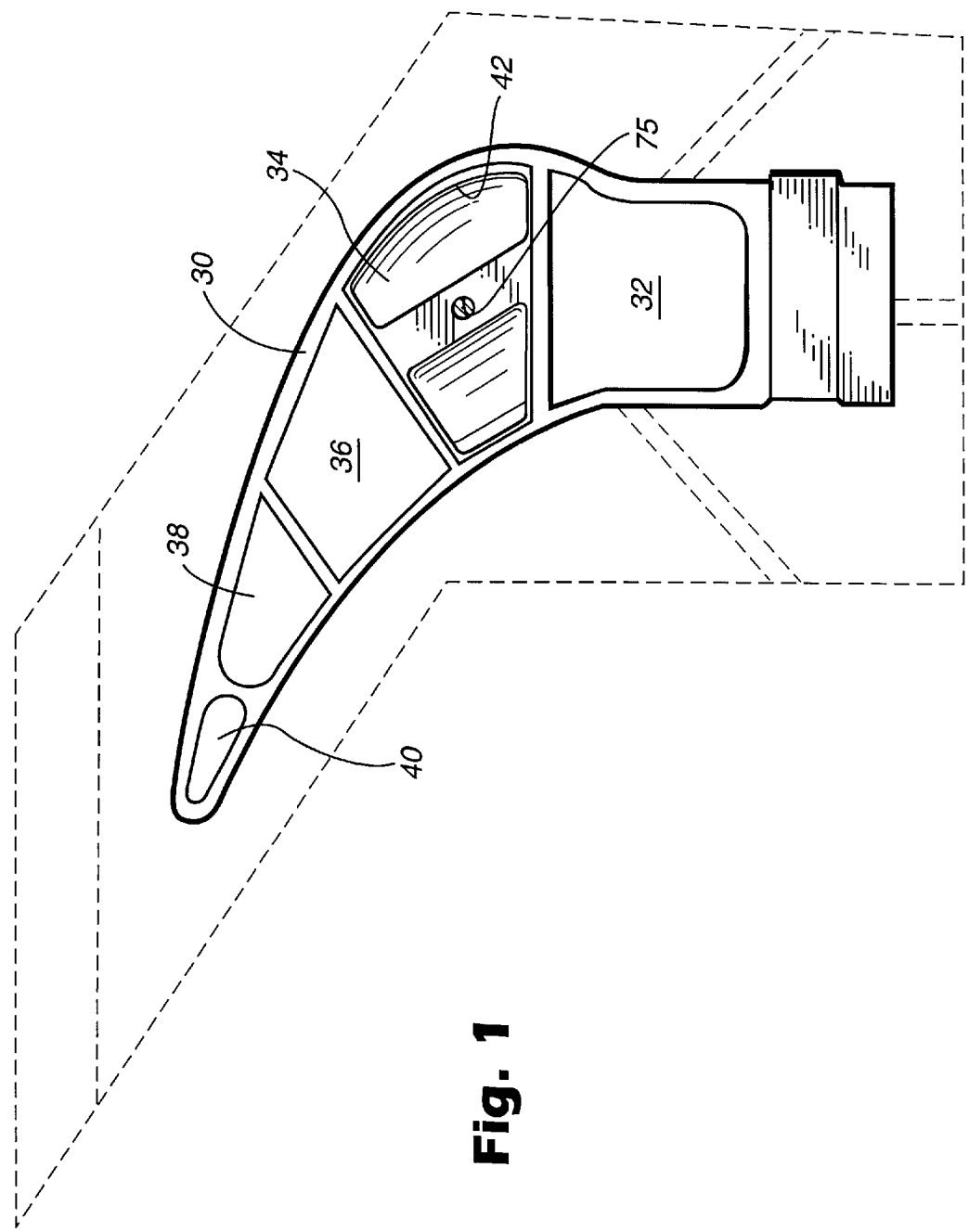
FIG. 1 is a top plan view of a nozzle segment illustrating the nozzle vane extensions with the cover removed.

The nozzle segment 10 forms part of an advanced gas turbine wherein the nozzle stages are cooled by a thermal medium, preferably steam. Particularly, and with reference to FIG. 2, the outer band 12 includes a forward cover, not shown, and an aft cover 20, the forward and aft covers defining a plenum 22 between the outer band 12 and the covers. Likewise, the inner band 14 forms with an inner cover 24 a plenum 26 therebetween. Cooling steam thus flows through an inlet formed in the front cover into the plenum 22. The plenum 22 also includes an impingement plate 28 having a plurality of openings for impingement cooling of the outer band 12. The spent cooling steam then flows through openings in extensions 30 for flow through one or more cavities of the vane. For example, five cavities are illustrated in FIG. 1 at 32, 34, 36, 38 and 40. Preferably, cooling steam is provided into the first, second and fourth cavities, i.e., cavities 32, 34 and 38, while spent cooling steam is returned via the third cavity 36. The fifth cavity 40 typically flows air for air-cooling the trailing edge of the vane. The cavities have inserts 42 described hereinafter for impingement cooling the surfaces of the vane.

The cooling steam flowing radially inwardly through the cavities exits. into the inner plenum 26 for flow through an impingement plate 42 for impingement cooling of the inner band 14. The spent impingement cooling steam flows through openings in extensions of the cavities of the vane for return flow via cavity 36 to a return steam outlet. Consequently, it will be appreciated that the cooling steam flows in a closed circuit through the nozzle segments. It is important that the cooling steam does not leak into the wheelspace area, the hot gas path or into any other of the turbine components. Concomitantly, however, it is desirable to provide a thermocouple for monitoring the temperature of the wheelspace. Thus, it has become necessary to provide the thermocouple lead through one of the nozzles through which the cooling medium flows.

Referring to FIG. 2, the thermocouple comprises a wire 44 disposed in a guide tube 46. The guide tube extends between the outer cover 20 and the inner cover 24, terminating in a sensor 48 for measuring the temperature in the wheelspace. As illustrated in FIG. 2, the guide tube 46 extends through the second cavity 34 of the vane 16. The guide tube is fixed adjacent opposite end portions in outer and inner sleeves 50 and 52. Sleeves 50 and 52 are, in turn, secured to the outer and inner covers 20 and 24, respectively. Preferably, the securement of the tube to the sleeves and the sleeves to the covers is by welding in each case whereby a seal is formed at opposite ends of the guide tube, preventing leakage of the steam within the cavity 34 past the covers. However, because the guide tube 46 extends in a changing thermal environment, the guide tube will thermally expand and contract. To accommodate the thermal expansion and contraction of the guide tube 46, the guide tube is shaped to extend non-linearly through the cavity 42 of the vane. Thus, as illustrated in FIGS. 2 and 8, the guide tube is provided with a serpentine shape which enables the guide tube to expand and contract between its fixed end portions relative to the outer and inner covers, thus accommodate the thermal mismatch.

The thermocouple tube accommodates the inserts and may not enter chambers 56 and 58. The insert 42 in cavity 34 is formed into two chambers 56 and 58, respectively. The walls 60 defining chamber 56 have apertures for flowing impingement cooling steam along the interior surface of the convex wall of the vane. Similarly, the walls 62 defining chamber 58 have apertures along the surface on the concave side of the vane for impingement cooling the convex vane wall. The chambers 56 and 58 are spaced one from the other by a central chamber 64 defined by a pair of elongated radially extending walls 66 and 68.

Figure 8:
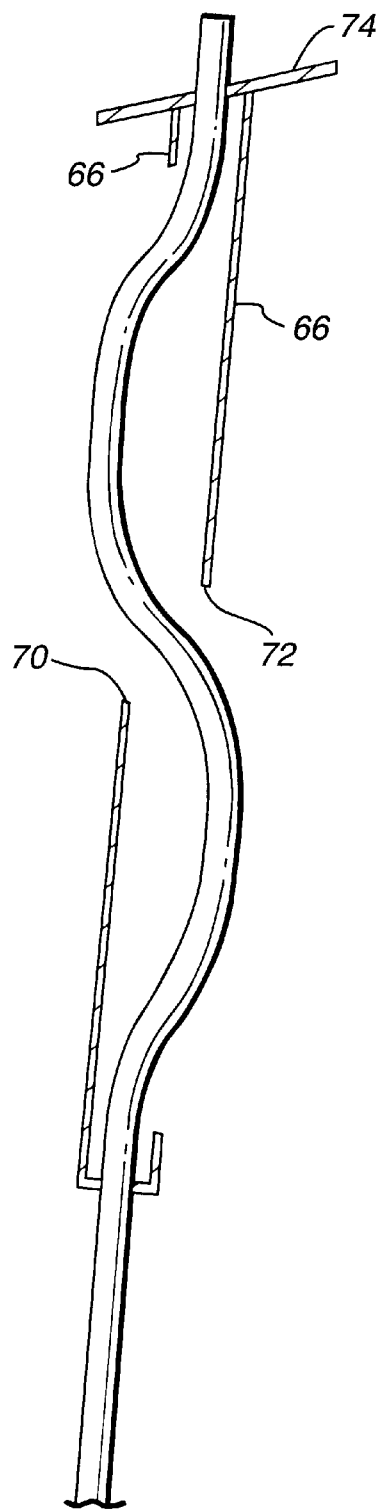
FIG. 8 is a fragmentary cross-sectional view of the insert illustrating the serpentine guide tube in the insert.

As best illustrated in FIG. 8, the wall 66 has a radial elongated slot 70, while the wall 66 has a radial elongated slot 72. The slots 70 and 72 are radially offset one from the other to receive serpentine sections of the guide tube. The insert also includes outer and inner insert covers 74 and 76, respectively, which open into the chambers 56 and 58 at opposite ends of the insert. Consequently, as illustrated in FIGS. 2 and 8, the guide tube 46 extends through an opening 75 in the top cover 74 into the central chamber 64. The serpentine tube 46 then exits central chamber 64 through the aperture 70 in the wall 66 and returns through the same aperture 70 into the central chamber. The guide tube then extends outwardly through the aperture 72 and returns through the same aperture 72 into the chamber 64 adjacent the inner band 14. The guide tube then extends through the lower cover for passage through the sleeve 52 and the inner cover 24. Because of the serpentine nature of the guide tube, the guide tube flexes to accommodate thermal expansion and contraction between end portions thereof fixed to sleeves 50 and 52. Additionally, the flexing action does not interfere with the insert or the walls of the vane, the walls of the insert being specifically configured to accommodate the flexing movement.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. In a turbine having stages including a fixed nozzle stage segment having inner and outer bands, a plurality of nozzle vanes extending between said inner and outer bands, and inner and outer covers overlying said inner and outer bands, respectively, apparatus for guiding a thermocouple through said fixed stage, comprising:

a tube extending through said outer cover, said outer band, a nozzle vane of said fixed nozzle stage, said inner band and said inner cover;

a thermocouple wire within said tube;

said tube extending non-linearly through said nozzle vane and fixed at opposite ends to said outer cover and said inner cover, respectively, said tube being responsive to temperature variations to expand and contract within said nozzle vane while remaining fixed at opposite ends thereof to said outer and inner covers; and the nozzle vane including a cavity between said inner and outer bands, an insert disposed in said cavity for receiving and flowing a thermal cooling medium, said insert having at least one aperture therethrough for receiving a portion of said tube.

2. Apparatus according to claim 1 wherein said tube is serpentine in configuration within the nozzle vane.

3. Apparatus according to claim 1 wherein said insert has a pair of chambers for receiving the cooling medium and openings through walls of said insert for flowing the cooling medium from the chambers through the openings to impingement-cool interior surfaces of said vane, said insert including a third chamber between said pair of chambers for receiving said tube, said one aperture opening through a wall defining said third chamber for extending the tube portion through said aperture.

4. Apparatus according to claim 3 wherein said third chamber includes a second wall and a second aperture opening through said second wall for receiving another portion of said tube therethrough.

5. Apparatus according to claim 4 wherein said apertures are radially displaced relative to one another.

6. Apparatus according to claim 5 wherein said apertures are elongated in a radial direction.

7. In a turbine having stages including a fixed nozzle stage segment having inner and outer bands, a plurality of nozzle vanes extending between said inner and outer bands, and inner and outer covers overlying said inner and outer bands, respectively, apparatus for guiding a thermocouple through said fixed stage, comprising:
　a tube extending through said outer cover, said outer band, a nozzle vane of said fixed nozzle stage, said inner band and said inner cover;
　a thermocouple wire within said tube;
　said tube extending non-linearly through said nozzle vane and fixed at opposite ends to said outer cover and said inner cover, respectively, said tube being responsive to temperature variations to expand and contract within said nozzle vane while remaining fixed at opposite ends thereof to said outer and inner covers; and
　a sleeve in an opening through at least one of said inner and outer covers and forming a seal therewith, said tube extending through said sleeve and being sealed thereto.

8. In a turbine having stages including a fixed nozzle stage segment having inner and outer bands, a plurality of nozzle vanes extending between said inner and outer bands, and inner and outer covers overlying said inner and outer bands, respectively, apparatus for guiding a thermocouple through said fixed stage, comprising:
　a tube extending through said outer cover, said outer band, a nozzle vane of said fixed nozzle stage, said inner band and said inner cover;
　a thermocouple wire within said tube;
　said tube extending non-linearly through said nozzle vane and fixed at opposite ends to said outer cover and said inner cover, respectively, said tube being responsive to temperature variations to expand and contract within said nozzle vane while remaining fixed at opposite ends thereof to said outer and inner covers; and
　a sleeve in an opening through each of said inner cover and said outer cover, said sleeves being secured and sealed to said inner and outer covers, respectively, said tube having end portions sealed to said sleeves.

9. In a turbine having stages including a fixed nozzle stage segment having inner and outer bands, a plurality of nozzle vanes extending between said inner and outer bands, and inner and outer covers overlying said inner and outer bands, respectively, apparatus for guiding a thermocouple through said fixed stage, comprising:
　a tube extending through said outer cover, said outer band, a nozzle vane of said fixed nozzle stage, said inner band-and said inner cover;
　a thermocouple wire within said tube;
　said tube extending non-linearly through said nozzle vane and fixed at opposite ends to said outer cover and said inner cover, respectively, said tube being responsive to temperature variations to expand and contract within said nozzle vane while remaining fixed at opposite ends thereof to said outer and inner covers; and
　the nozzle vane including a cavity between said inner and outer bands and, an insert disposed in said cavity for receiving and flowing a thermal cooling medium, said insert having a chamber for receiving a portion of said tube and in which chamber the cooling medium does not flow.

\* \* \* \* \*